United States Patent [19]

Nichols

[11] 4,132,011

[45] Jan. 2, 1979

[54] WASTE HEAT RECYCLING SYSTEM

[75] Inventor: John A. Nichols, Stoughton, Mass.

[73] Assignee: Airtech Systems, Inc., Stoughton, Mass.

[21] Appl. No.: 696,738

[22] Filed: Jun. 16, 1976

[51] Int. Cl.² ............................................. F26B 13/02
[52] U.S. Cl. .......................................... 34/86; 34/216; 165/DIG. 2
[58] Field of Search .................. 34/86, 156, 216, 217, 34/35, 23; 165/95, 76, DIG. 2

[56] References Cited

U.S. PATENT DOCUMENTS

| | | | |
|---|---|---|---|
| 1,752,857 | 4/1930 | Seede | 34/86 |
| 1,780,300 | 11/1930 | Jacobus et al. | 165/95 |
| 2,711,591 | 6/1955 | Wellmar | 34/86 |
| 3,191,210 | 6/1965 | Fischer | 34/156 |
| 3,216,127 | 11/1965 | Ruff | 34/86 |
| 3,705,622 | 12/1972 | Schwarz | 165/143 |
| 3,827,639 | 8/1974 | Relve et al. | 34/156 |
| 4,011,662 | 3/1977 | Davis et al. | 34/86 |

Primary Examiner—John J. Camby
Assistant Examiner—Larry I. Schwartz
Attorney, Agent, or Firm—Seed, Berry, Vernon & Baynham

[57] ABSTRACT

A heat exchanger heats fresh air moving to a product dryer by running the fresh air around hot exhaust tubes which are discharging from the dryer. Detergent sprays may be positioned to direct cleaning fluid into the tubes. The fresh air is introduced into a pre-dryer through pipes having nozzles which are at 30° angles to the product path.

5 Claims, 5 Drawing Figures

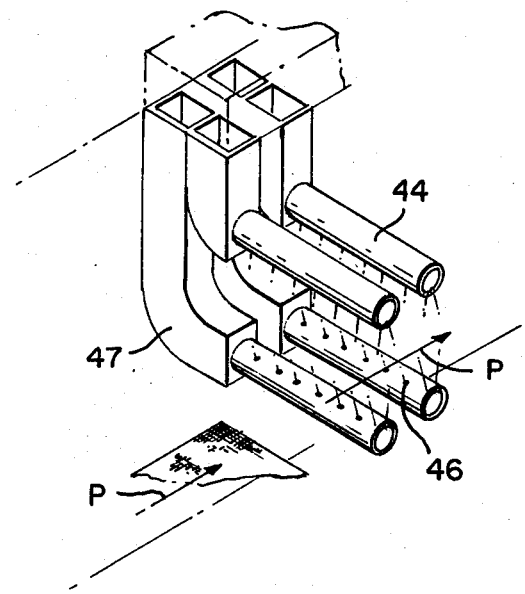
FIG. 2
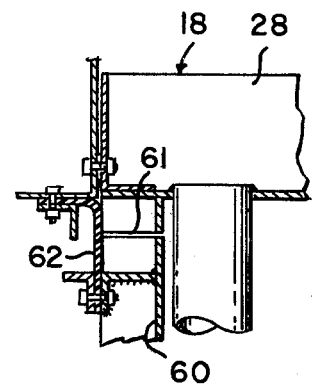
FIG. 5
FIG. 3
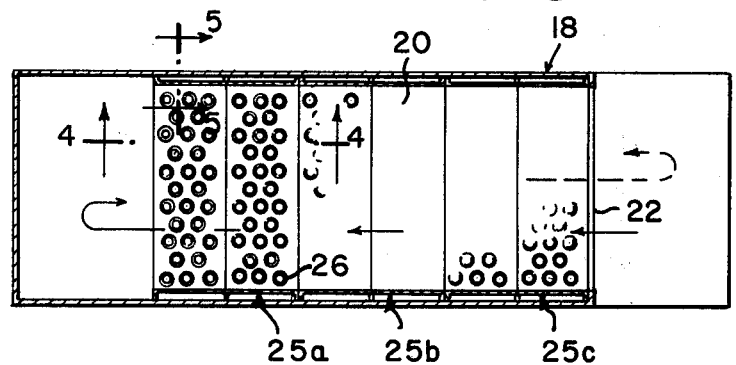
FIG. 4
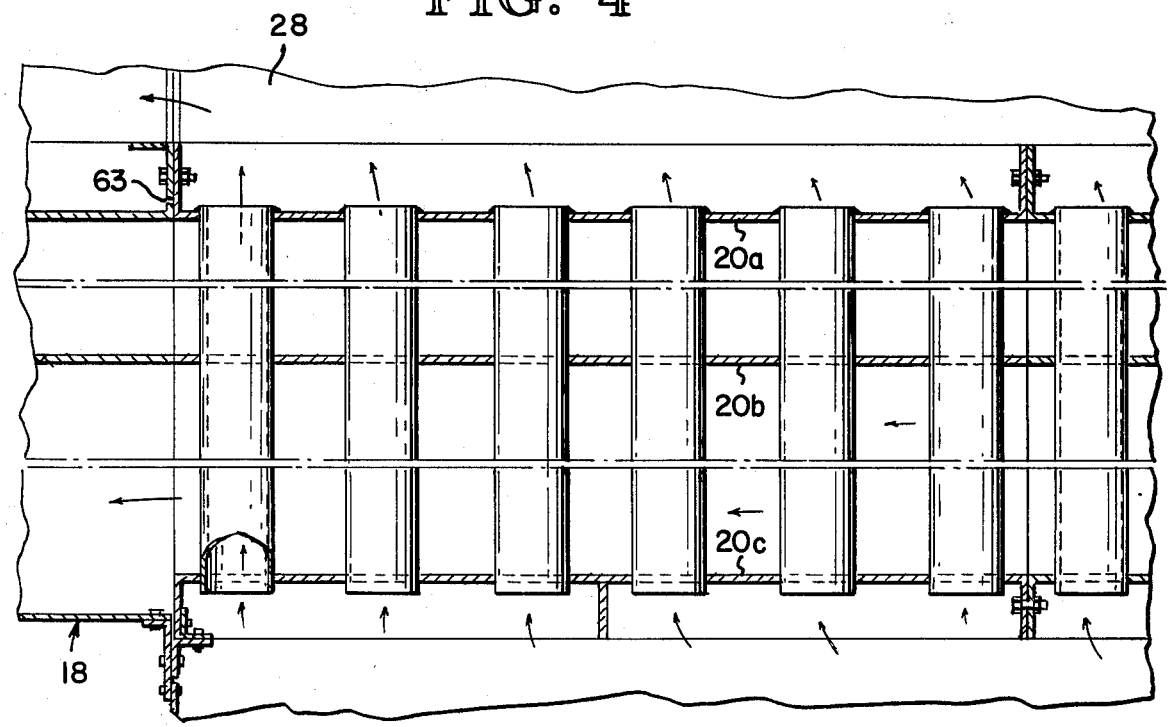

WASTE HEAT RECYCLING SYSTEM

BACKGROUND OF THE INVENTION

1. Field of the Invention

This invention pertains to dryers, especially fabric dryers, and, more particularly, to means for reducing the fuel consumption necessary to heat the dryers increasing production of the dryers, and to reducing the emission of pollutants into the air from the exhaust of the dryers.

2. Summary of the Invention

It is an object of this invention to provide an energy saving system for a conventional dryer of fabric or other products.

It is another object of this invention to provide an efficient heat exchanger for heating air introduced into a product dryer.

It is still another object of this invention to combine an air heater with an exhaust pollutant remover.

Still another object is to increase production rates of a known dryer by simultaneously reducing the amount of energy necessary to heat the dryer.

Basically, these objects are obtained by combining on a conventional dryer a fresh air chamber in which fresh air is forced along a circuitous path. Tubes for removing the hot exhaust from the dryer are positioned to be exposed to the air in said circuitous path so that the exhaust is cooled simultaneously with the increase in temperature of the fresh air. The most desirable advantages from this system are that a significant amount of heat is recovered and transferred into the fresh air and thus reduces the amount of fuel consumed in bringing the air up to drying temperature. Secondly, this waste heat allows an increase in production rates of the dryer due to pre-drying without an increase in energy consumption. Thirdly, reducing the temperature of the exhaust gases facilitates removal of moisture and polluting particles. Fourthly, the pre-drying at a temperature generally intermediate room temperature and dryer temperature gives an improved feel and finish to the fabric.

In embodiments in which the exhaust collects in the tubes, the exhaust tubes are cleaned by being sprayed with a cleaning solution which helps to keep the interior of the tubes free from buildup and optimizes heat transfer between the exhaust gases and the fresh air. Also in the preferred embodiment the heated fresh air is introduced into the pre-dryer through pipes having nozzles which lie at angles of approximately 30° to the vertical above and below the path of the moving product. In this way the air flows more smoothly along the product providing better heating and less vibration to the product. Preferably a portion of the heated air can also be diverted as required to supply make-up air to the main dryer sections also.

BRIEF DESCRIPTION OF THE FIGURES OF THE DRAWING

FIG. 2 is a fragmentary isometric of a portion of the pre-dryer shown in FIG. 1.

FIG. 3 is a horizontal section taken along the line 3—3 of FIG. 1.

FIG. 4 is a fragmentary, vertical section taken along the line 4—4 of FIG. 3.

FIG. 5 is a fragmentary, vertical section taken along the line 5—5 of FIG. 3.

DETAILED DESCRIPTION OF THE INVENTION

Figure 1:
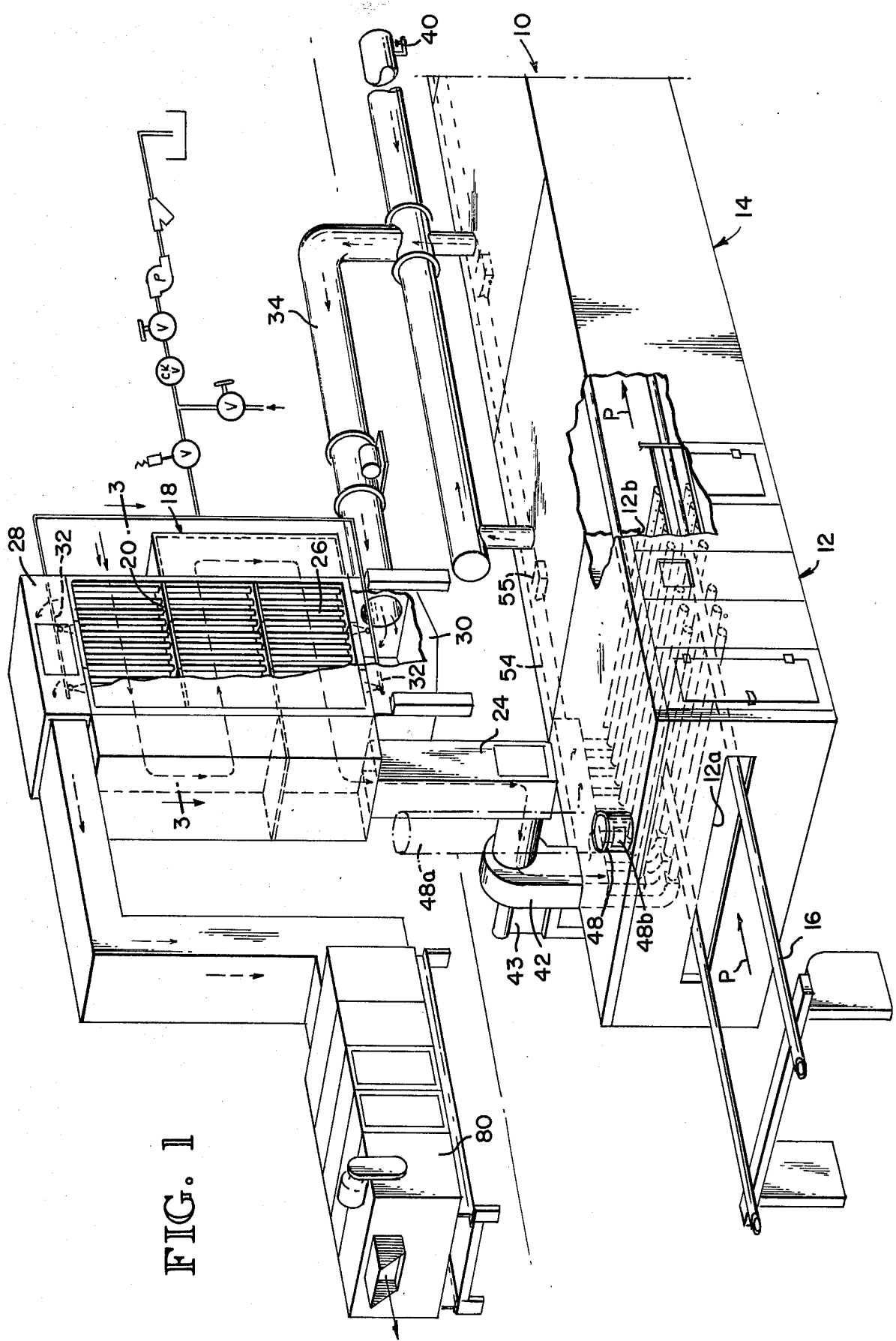
FIG. 1 is an isometric of a preferred form of the invention with parts broken away for clarity.

As best shown in FIG. 1, a dryer 10 includes a pre-dryer section 12 and a main dryer section or sections 14. The pre-dryer and dryer sections are fabricated from three-inch thick, insulated panels to receive fabric or other product. Drying temperatures of approximately 300° F. are obtained in the main dryer sections by heating with gas, oil, etc. In the apparatus illustrated, a conveyor such as moving rails 16 carries a wet synthetic fabric along a path P with the fabric impaled on upright pins on the rails in a conventional manner. The path passes into the pre-dryer through a transverse slot 12a in the pre-dryer and thence through a second transverse slot 12b between the pre-dryer and the main dryer sections. As is well understood, the fabric departing from the opposite end of the dryer will be dry and free of volatile fluids.

The heat recycling apparatus of this invention includes a chamber 18 having a plurality of baffle or divider plates 20a, 20b, 20c which direct fresh air from an inlet 22 along a circuitous path to a fresh air outlet duct 24. Positioned vertically within the chamber and exposed to the fresh air are a plurality of modular tube sections 25 each having a plurality of approximately two-inch diameter aluminum tubes 26 each about twelve feet in length. The tubes connect with an exhaust outlet header 28 and an exhaust inlet header 30. Positioned within each of the headers are a plurality of cleaning solution nozzles 32 which direct detergent spray into the tubes for cleaning the tubes and maintaining their high heat transferability. It should be understood, however, that these sprays are needed only where the exhaust is of a type that tends to clog the exhaust tubes.

The exhaust inlet header for the hot exhaust tubes connects to a duct 34 that communicates with various main dryer sections 14 to remove the hot exhaust at a temperature of about 300° F. from the dryer sections. Preferably the duct 34 is at an angle to the horizontal so that condensation will flow along the duct to be discharged through a drain tube 40.

Fresh air heated to a temperature of about 185° F. by the exhaust gases leaves the chamber 18 through the duct 24 and is drawn through the chamber and forced into the pre-dryer 12 by a conventional centrifugal fan 42 driven by a motor 43. The fan directs most of the heated air into pipes 44 which are extended transversely of the product path P and above and below the path. The pipes are provided with nozzles or orifices 46 which are at an approximately 15° angle with respect to the vertical. The 15° angle directs the air at an angle to the fabric to avoid bouncing the fabric off the pins on the rails 16 and more adequately wipe the air along the fabric for more even drying action. The pipes are spaced approximately 12 to 15 inches apart and can vary in diameter based on dryer width and air volumes. Each pipe is fed from the main fan 42 and is provided with a damper 47 for individual air volume control. The pre-dryer also has an exhaust fan 48 to remove excess air that has not been sucked into the dryer slot 12b. This exhaust fan 48 has a unit comprising a volume control damper, face damper, and a bypass damper so exhaust air from the pre-dryer can either be thrown out into the atmosphere through a stack 48a or directed towards the ceiling of the plant for winter heat purposes through a vent 48b. This unit can be automatically controlled by a temperature thermostat sensing outdoor temperature to determine whether to discharge to atmosphere or to inside the plant. In the 185° F. preheat the fabric does not get heated to a point to drive off significant pollutant gases.

The fan 42 also communicates with a make-up duct 54 which is provided with dampers 55 for each of the main dryer sections to provide make-up air to the dryer sections as desired. Only enough make-up air is used in the main dryer sections to prevent dryer air unbalance conditions which is accomplished by means of the volume control dampers for each make-up air point in the dryer sections. Dryer air unbalanced conditions occurs when excess recirculated air is discharged or excess fresh air is introduced to drastically change the normal operating pressures within the main dryer sections.

In operation of a dryer exhausting air at 300° F., the heat exchanger will reclaim about 45 to 55 percent of the waste heat. That is, when an exhaust of approximately 10,000 CFM at 300° F. air is put into the tubes 26, the exhaust contains approximately 1,732,000 BTU/HR. When calculating on the basis of SCFM, that is air at 70° F., then 10,000 ACFM at 300° F. converted to SCFM equals:

$$\frac{460 + 70}{460 + 300} = \frac{530° F.}{760° F.} \quad (10,000) \frac{530}{760} (300 - 70) (1.08) = 1,732,000 \text{ BTU/HR.}$$

heat available in exhaust stream.

If the outside air temperature is 70° F. the cold air stream calculated for 7,000 SCFM returning to the pre-dryer will deliver from 779,400 BTU/HR. to 952,600 BTU/HR. Therefor the efficiency will be 45 to 55 percent.

This 10,000 CFM at 185° F. will be directed to the supply fan 42 which will force some of the heated air to the existing dryer compartments to be used as make-up air as mentioned above. By this method the dryer will conserve fuel usage due to its make-up air being introduced at 180° F. rather than at 70° F. The difference in heat energy is saved by the ability of the dryer heat source to use less BTU to reach operating conditions.

Since the air in the pre-dryer is about 185° F. it can be seen that the fabric is more gradually brought from room temperature of about 80° F. to dryer temperature of about 300° F. by passing through this region of an intermediate temperature. Such gradual heating reduces thermal shock on the fabric resulting in a better feel to the dried fabric.

The heat exchanger tubes 22 are all in welded, modular units 25a, 25b, 25c. That is, the tubes consist of several completely independent sections sealed to prevent cross leakage. The use of modular tube construction allows one section to be replaced independent of the other. Due to expansion of the sections, a unique system is designed for holding the tubes. Each module is separated at the top side plates 60 by means of a saw cut 61. This allows the top header to expand. The tubes are kept in line by means of the divider plate sheets 20b and 20c. A flexible neoprene strip 62 is then secured to all modules after assembly into place in the chamber 18 to allow for expansion and also for a tight seal. The top plenum or header 28 and any connecting duct work is also separated by a saw cut 63 and must have a flexible joint so as not to have too rigid a construction and be able to allow the unit to expand. The joints must all be seamed by bolting at close spacing and the use of silicon high temperature gaskets and caulking. The joints need this special attention so as not to leak contaminated air into the fresh air stream.

If desired, a precipitator 80 or other contaminant removal apparatus can be attached to the outlet end of the header 28 to completely clean the exhaust.

While the preferred embodiment of the invention has been illustrated and described it should be understood that variations will be apparent to one skilled in the art without departing from the principles expressed herein. Accordingly, the invention is not to be limited to the specific embodiment illustrated.

The embodiments of the invention in which a particular property or privilege is claimed are defined as follows:

1. Heat recycling apparatus for hot air dryers of the type having a pre-dryer section followed by a main dryer section each of which comprises a hollow insulated chamber through which product to be dried is carried along a path by a moving conveyor, the improvement comprising:

a chamber for receiving fresh air to be introduced into the dryer, said chamber including baffle means for directing the fresh air from an air inlet to an air outlet through a circuitous multi-pass route within said chamber, a plurality of vertically positioned hot exhaust tubes within said chamber and exposed in said circuitous route, said hot exhaust tubes having inlet and outlet ends, said tube outlet ends being adjacent said fresh air inlet, said vertically positioned hot exhaust tubes including modular sections of tubes each modular section being mounted independent of the next whereby sections can be replaced as modules, said tubes including headers having cleaning spray nozzles directed upwardly and downwardly into said tubes for cleaning the interior of the tubes, means for forcing the fresh air along said route and into said pre-dryer section for extracting heat from the exhaust gases and increasing the temperature of the pre-dryer section so as to preheat the product to reduce time in the main dryer section, means for forcing hot exhaust from said main dryer section through said tubes for heating the fresh air prior to entering the pre-dryer section.

2. The apparatus of claim 1, said pre-dryer section including a set of air pipes lying transversely of the product path, said pipes having outlet nozzles directed toward said product path at about a 15 degree angle to vertical.

3. The apparatus of claim 1, including means for directing heated fresh air to the main dryer section for use as make-up air.

4. The apparatus of claim 1, said exhaust tubes being mounted for movement relative to the chamber whereby the tubes can expand when heated.

5. The apparatus of claim 1, including means for directing heated air from said pre-dryer section selectively to atmosphere or to the area around the pre-dryer.

* * * * *